Jan. 8, 1946.  J. D. RYAN ET AL  2,392,770
PROCESS FOR PRODUCING BENT LAMINATED SAFETY GLASS
Filed Feb. 27, 1942   2 Sheets-Sheet 1

Inventors
JOSEPH D. RYAN.
GEORGE R. ZOLMAN.
By Frank Fraser
Attorney

Jan. 8, 1946. J. D. RYAN ET AL 2,392,770

PROCESS FOR PRODUCING BENT LAMINATED SAFETY GLASS

Filed Feb. 27, 1942 2 Sheets-Sheet 2

Inventors
JOSEPH D. RYAN.
GEORGE R. ZOLMAN.
By Frank Fraser
Attorney

Patented Jan. 8, 1946

2,392,770

UNITED STATES PATENT OFFICE 2,392,770

PROCESS FOR PRODUCING BENT LAMINATED SAFETY GLASS

Joseph D. Ryan and George R. Zolman, Toledo, Ohio, assignors to Libbey-Owens-Ford Glass Company, Toledo, Ohio, a corporation of Ohio Application February 27, 1942, Serial No. 432,664

7 Claims. (Cl. 49—67)

The present invention relates to the manufacture of bent laminated safety glass including at least two sheets of glass and an interposed layer of thermoplastic adherent thereto.

In the production of bent laminated safety glass, it is customary to bend the glass sheets to be laminated in pairs and to keep the said sheets from adhering to one another during bending by coating the inner surface of one or both sheets with a relatively thin layer of a suitable "parting" material. Only a comparatively few materials seem suited for this purpose and whiting (calcium carbonate) and diatomaceous earth have been previously used; also, the material sold in the trade under the name "Varcel" and which comprises a finely divided silica has been employed.

One of the principal difficulties encountered in the making of bent laminated safety glass resides in the fact that after the bending operation, the glass sheets must be washed by a hand operation. This is especially true where a number of different types of bent glass are to be cleansed prior to lamination simultaneously. Thus, while it is possible to build a washing machine to take care of one particular kind of bend, it is obvious that with a large number of different types of bends, a large variety of washing machines would have to be built to take care of any quantity production. Whiting and "Varcel" are of course water-insoluble and when used as the intermediate or parting layer between the glass plates during the bending operation it is necessary to wash the glass, using Bon Ami. On the other hand, if a detergent is employed, a scrubbing or friction action must be applied to the glass surfaces to be cleaned to remove the whiting or "Varcel." Experiments with whiting also showed that the grain size is too large and investigation shows that an extremely finely divided whiting is difficult to obtain on the open market.

It is an aim of this invention to expedite the washing of bent glass sheets by making use of a special water-soluble parting material between the said sheets during bending and which material can be simply rinsed off of the glass without any rubbing or scrubbing. In this way, the washing of the glass is not only greatly facilitated but also the need for a large number of washing machines when different types of bends are to be cleansed is eliminated. While many water-soluble materials are available for this purpose, most of them decompose at the temperature required for bending the glass sheets, which is ordinarily around 1100 degrees to 1250 degrees Fahrenheit; while others attack the surface of the glass, ruining the finish; and still others melt, causing the glass sheets to be fused together.

After considerable research work, we have now discovered a water-soluble material which gives very satisfactory results and which has been used in the manufacture of a quantity of bent glass in commercial production. This material consists of a water-soluble salt such as sodium sulphate, potassium sulphate and sodium bicarbonate. These salts readily dissolve in water and can be sprayed on the glass sheets from water solutions without difficulty. They can also be removed from the glass sheets simply by rinsing with water in which they will dissolve. If desired, the glass sheets can also be subjected to a final rinse with distilled water or condensate to avoid the deposition of water-soluble salts on the surfaces of the glass sheets which would later show up on lamination as streaks, haze, or so-called water spots. By use of the materials and the practice of the process herein disclosed, the washing of the glass sheets subsequent to bending and prior to laminating will be greatly facilitated, with a resulting improvement in the quality of the laminated safety glass insofar as cleanliness and clarity of the glass sheets is concerned.

Other objects and advantages of the invention will become more apparent during the course of the following description, when taken in connection with the accompanying drawings.

In the drawings, wherein like numerals are employed to designate like parts throughout the same:

Generally stated, in carrying out the invention, the flat sheets or plates of glass to be bent are first preferably given a cleansing operation with suitable detergents, such as Santomerse, Orvus, and the like, to place the glass in a condition satisfactory for lamination. After washing, the clean glass is coated with the water-soluble salt, then properly assembled with one another, and placed in the bending furnace. After bending, the glass sheets are removed from the furnace, washed, and then laminated with an interposed layer of plastic material to provide a composite structure.

Figure 1:
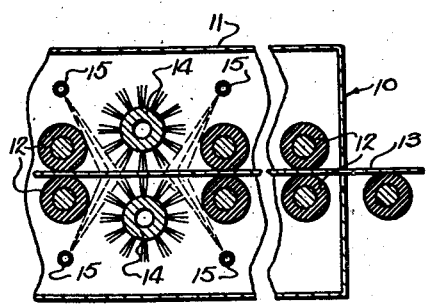
Fig. 1 is a vertical longitudinal section through a portion of a washing apparatus and showing the application of the parting material to the glass sheets subsequent to the washing operation.
Figure 1:
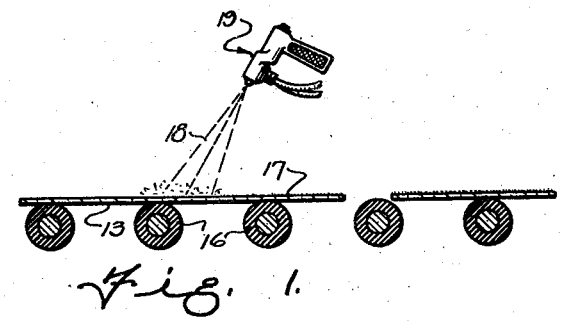

With reference particularly to Fig. 1, there is disclosed an apparatus for washing the glass sheets or plates before bending, said apparatus being designated in its entirety by the numeral 10 and comprising a housing 11 in which are arranged a plurality of pairs of horizontally aligned feed rolls 12. The flat sheets or plates of glass 13 to be washed are fed between the pairs of rolls 12 and are acted upon by one or more pairs of washing brushes 14 engaging opposite surfaces of the said sheets. To assist in the washing operation, a suitable detergent can be applied to the opposite surfaces of the said sheets from spray pipes 15 or in any other desired manner.

Upon leaving the washing apparatus 10, the glass sheets 13 are carried forwardly upon a series of conveyor rolls 16 and a coating of water-soluble salt 17 sprayed thereupon, as indicated at 18, from a spray gun 19. For spraying the salt, a concentrated solution is desired. By way of example, we have found that when 20 pounds of sodium sulphate is dissolved in 100 pounds of water (that is to say, a 20% solution) excellent results are obtained. In some cases, it might be desirable to add a low boiling alcohol (such as methanol or ethanol) to the water solution to speed up the drying. It was also found possible to add a certain quantity of alcohol to the above mixture, namely 36 pounds, without causing precipitation of the sodium sulphate from the solution.

In spraying the water-soluble material upon the glass sheets, it is desirable, although not essential, that the glass sheets be heated as this speeds the evaporation of the water. Furthermore, it is also preferred in the spraying operation to use a high ratio of air volume to solution as it leaves the spray gun, thereby giving as dry a spray as possible. Further, if desired, a very small amount, say 1/100 of 1%, of Santomerse, Orvus, or other wetting agents may be added to the solution just prior to spraying. In some cases, it has been found desirable to spray only one plate of the pair of glass sheets to be bent, although both plates could be so sprayed if deemed necessary.

Figure 2:
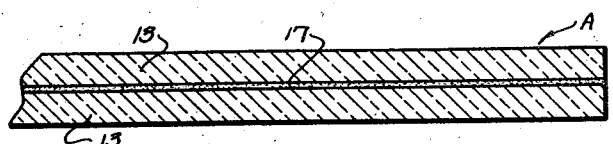
Fig. 2 is a transverse section through two sheets of glass coated and ready for bending.

After the glass sheets 13 have been washed and coated, two of the said sheets are associated with one another, as shown in Fig. 2, with the layer of parting material 17 disposed therebetween. The assembled glass sheets, designated by the letter A, are then placed upon a suitable mold 20 within a furnace 21 and heated until the said sheets become softened and settle down by their own weight to take the shape of the mold as shown in broken lines in Fig. 3.

Figure 3:
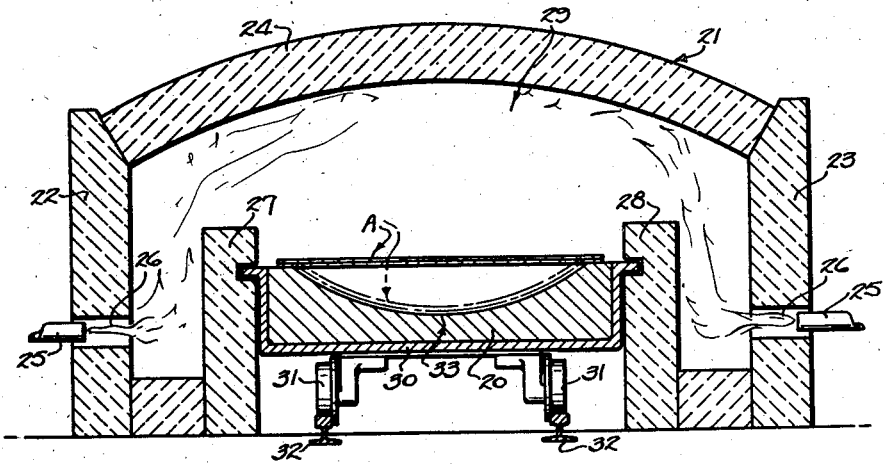
Fig. 3 is a vertical transverse section through one type of bending furnace.

In Fig. 3 has been illustrated one type of mold and furnace which can be employed, although it is to be definitely understood that the invention is not restricted to the use of any specific bending apparatus. The furnace 21 includes the opposite vertical side walls 22 and 23 and an arch 24, said furnace being heated by means of gas burners 25 projecting through openings 26 in the side walls 22 and 23. The flames from the burners 25 are directed upwardly toward the arch by vertical baffle walls 27 and 28 spaced inwardly of the side walls 22 and 23 respectively; said baffle walls terminating some distance beneath the arch so that the heating flames pass over the tops thereof into the heating chamber 29 of the furnace.

Figure 4:
Fig. 4 is a transverse section showing the glass sheets after bending.

The baffle walls 27 and 28 define therebetween a way for the car or truck 30 carrying the concave bending mold 20; said car being mounted upon wheels 31 rolling along rails 32 which extend longitudinally of the furnace. The upper surface 33 of the bending mold 20 constitutes the shaping surface and is of a curvature corresponding to the curvature to be given the glass sheets 13 to be bent. After being bent, the glass sheets are removed from the mold and, as shown in Fig. 4, the intermediate or parting layer 17 of salt is still arranged therebetween.

The glass sheets are bent at temperatures ranging ordinarily from 1100 degrees to 1250 degrees Fahrenheit, and it has been found that the water-soluble salts mentioned above are of such character that they will not melt at such temperatures, will not attack the surfaces of the glass sheets, and will not decompose to give rise to water-insoluble materials. The sodium bicarbonate does not undergo sufficient decomposition during the bending operation to give rise to sodium carbonate, which in itself, when used under the same conditions, stains the glass.

Figure 7:
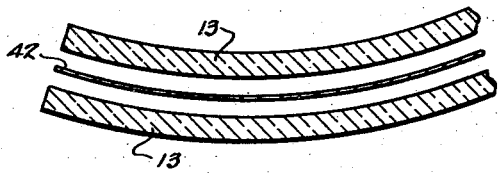
Fig. 7 is a diagrammatic view illustrating two bent glass sheets and interposed layer of plastic to be bonded together.
Figure 6:
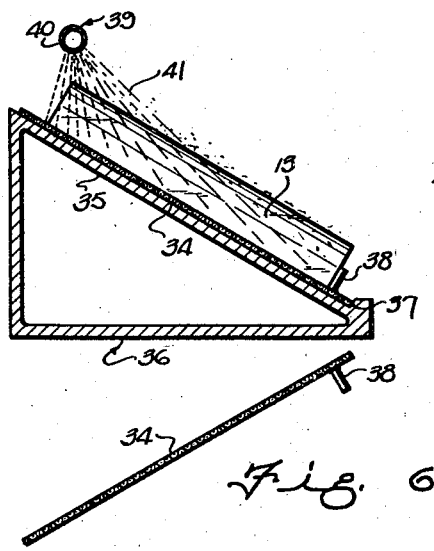
Fig. 6 is a transverse section taken substantially on line 6—6 of Fig. 5.
Figure 5:
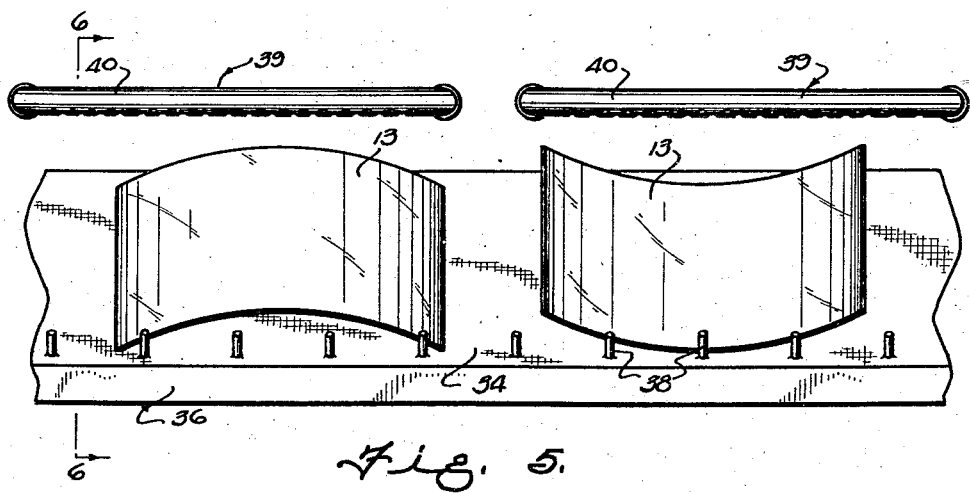
Fig. 5 is a plan view of apparatus for washing the bent sheets.

Upon leaving the bending furnace 21, the glass sheets 13 are separated and the water-soluble salt washed therefrom. This is herein accomplished by subjecting the sheets first to a water wash without rubbing followed by a condensate rinse. For the purpose of washing the glass sheets, there is provided an apparatus including an endless belt 34, the upper horizontal flight of which is disposed in an inclined or tilted position as shown in Fig. 6 and slides over the inclined bed 35 of a stationary support 36. The stationary support 36 is provided along its forward edge with a raised shoulder 37 engageable by the forward edge of the endless belt 34 to keep it from sliding off said support. Also carried by the endless belt are a plurality of upstanding pins 38, and as shown in Figs. 6 and 7 the bent sheets of glass 13 to be washed are placed upon the upper flight of the said belt and held in place thereon by the pins 38.

The endless belt 34 carries the glass sheets forwardly beneath one or a plurality of spray devices 39 comprising pipes 40 which serve to direct a spray of wash water 41 downwardly upon the glass sheets and which acts to dissolve and wash off the salt coating. No scrubbing or rubbing of the glass sheets is necessary. After the water wash, the glass sheets are preferably subjected to a final rinse with distilled water or condensate to avoid the deposition of water-soluble salts on the surfaces of the said sheets. By washing the glass sheets in this manner, the water-soluble salts can be completely removed therefrom.

Figure 8:
Fig. 8 is a transverse section through a sheet of bent safety glass.

After the glass sheets have been washed, rinsed, and then dried, two of the sheets 13 are assembled with an interposed layer of plastic material 42, as shown in Fig. 8, to form a "sandwich." The assembled laminations can then be bonded to one another in accordance with any of the known methods of making laminated safety glass to form the composite structure shown in Fig. 9.

It is to be understood that the form of the invention herewith shown and described is to be taken as a preferred embodiment of the same, and that various changes in the shape, size and arrangement of parts may be resorted to without departing from the spirit of the invention or the scope of the subjoined claims.

We claim:

1. In the manufacture of laminated safety glass including two sheets of glass and an interposed layer of thermoplastic adherent thereto, the process comprising coating one surface of at least one of the glass sheets with a water-soluble salt that remains water soluble, solid and inert to glass at the temperatures employed in bending glass sheets, placing the second sheet of glass upon the first sheet in contact with said coating, heating said sheets, bending them simultaneously, and then rinsing the glass sheets to remove the coating of water-soluble salt therefrom prior to the laminating of the said sheets with the plastic interlayer.

2. In the manufacture of laminated safety glass including two sheets of glass and an interposed layer of thermoplastic adherent thereto, the process comprising spraying a solution of water-soluble salt that remains water soluble, solid and inert to glass at the temperatures employed in bending glass sheets upon one surface of at least one of the glass sheets, placing the second sheet of glass upon the first sheet and in contact with said coating, heating said sheets, bending them simultaneously, and then subjecting the glass sheets to a water wash without rubbing to remove the salt coating therefrom before laminating said sheets with the plastic interlayer.

3. In the manufacture of laminated safety glass including two sheets of glass and an interposed layer of thermoplastic adherent thereto, the process comprising coating one surface of at least one of the glass sheets with a water-soluble salt that remains water soluble, solid and inert to glass at the temperatures employed in bending glass sheets, placing the second sheet of glass upon the first sheet in contact with said coating, heating said sheets, bending them simultaneously, and then rinsing the glass sheets with water and finally subjecting them to a condensate rinse to remove the water-soluble salt before laminating said sheets with the plastic interlayer.

4. In the manufacture of laminated safety glass including two sheets of glass and an interposed layer of thermoplastic adherent thereto, the process comprising spraying a solution of water-soluble salt that remains water soluble, solid and inert to glass at the temperatures employed in bending glass sheets upon one surface of at least one of the glass sheets, placing the second sheet of glass upon the first sheet and in contact with said coating, heating said sheets, bending them simultaneously, and then subjecting the glass sheets to a water wash without rubbing followed by a condensate rinse to remove the salt coating therefrom prior to laminating the said sheets with the plastic interlayer.

5. In the bending of glass sheets in pairs for subsequent lamination with an interposed layer of the thermosplastic to provide laminated safety glass, the step of coating the inner surface of at least one of the glass sheets with a water-soluble salt that remains water soluble, solid and inert to glass at the temperatures employed in bending glass sheets prior to bending.

6. In the bending of glass sheets in pairs at temperatures ranging from approximately 1100 degrees to 1250 degrees Fahrenheit for lamination with an interposed layer of thermoplastic to produce laminated safety glass, the step of coating the inner surface of at least one of the glass sheets prior to bending with a water-soluble material that remains water soluble, solid and inert to glass at the temperatures employed in bending glass sheets.

7. A parting material for use between two sheets of glass to be bent at temperatures ranging from approximately 1100 degrees to 1250 degrees Fahrenheit, comprising a water-soluble material that remains water soluble, solid and inert to glass at such bending temperatures.

JOSEPH D. RYAN.
GEORGE R. ZOLMAN.